United States Patent
Loop et al.

(10) Patent No.: US 8,980,143 B2
(45) Date of Patent: Mar. 17, 2015

(54) BIOMASS AND WASTE PLASTICS DEPOLYMERIZATION MACHINE AND METHODS VIA SUPERCRITICAL WATER

(76) Inventors: Thomas E. Loop, Seattle, WA (US); James D. Flynn, Auburn, WA (US); Graham Allan, Kenmore, WA (US); Steven C. Van Swearingen, Edmonds, WA (US); Kevin O. Gaw, Seattle, WA (US)

( * ) Notice: Subject to any disclaimer, the term of this patent is extended or adjusted under 35 U.S.C. 154(b) by 442 days.

(21) Appl. No.: 13/297,217
(22) Filed: Nov. 15, 2011
(65) Prior Publication Data
US 2012/0184788 A1 Jul. 19, 2012

Related U.S. Application Data

(63) Continuation-in-part of application No. 12/828,102, filed on Jun. 30, 2010, now Pat. No. 8,057,666, which is a continuation-in-part of application No.
(Continued)

(51) Int. Cl.
*B01D 17/02* (2006.01)
*B29B 17/02* (2006.01)
(Continued)

(52) U.S. Cl.
CPC ............... *B01J 3/008* (2013.01); *B01J 8/0045* (2013.01); *B01J 8/1836* (2013.01); *B01J 8/20* (2013.01);
(Continued)

(58) Field of Classification Search
CPC ...... B01D 17/00; B01D 17/005; B29B 17/00; B29B 17/02; B29B 2017/00; B29B 2017/001; B29B 2017/0293; B29B 2017/0203; B01J 3/008; B01J 8/008; B01J 16/00; B01J 2219/24; B01J 19/18; B01J 19/087; B01J 19/1812; B01J 19/1843; B01J 8/0045; B01J 8/1836; B01J 8/20; B01J 8/42; B01J 2219/0854; B01J 2219/089
USPC ......... 210/175, 177, 180–182, 259, 511, 634, 210/639, 749, 758–761, 773, 774, 806, 210/808; 44/307, 308, 605, 606; 422/138, 422/198, 199, 208, 602, 608, 618, 242, 422/236; 585/240, 241, 800, 802, 833–838; 219/600, 618, 628, 630, 635; 554/8–23; 264/11–13, 37.1, 37.18, 264/454; 71/11–13
See application file for complete search history.

(56) References Cited

U.S. PATENT DOCUMENTS 2,626,856 A * 1/1953 Alles ............................ 422/229
3,522,214 A * 7/1970 Crawford et al. ............... 526/65
(Continued)

FOREIGN PATENT DOCUMENTS

CN 200610011584 10/2007
CN 200610011585 10/2007
EP PCT/EP2007/054378 11/2007

OTHER PUBLICATIONS

Masaru Watanabe, Hiroshi Inomata, Mitsumasa Osada, Takafumi Sato, Tadafumi Adschiri and Kunio Arai, "Catalytic effects of NaOH and ZrO2 for partial oxidative gasification of n-hexadecane and lignin in supercritical water" Fuel, vol. 82, Issue 5, Mar. 1, 2003, pp. 545-552.
(Continued)

*Primary Examiner* — Joseph Drodge
(74) *Attorney, Agent, or Firm* — Thomas E. Loop

(57) ABSTRACT

A method for transforming a selected polymeric material into a plurality of reaction products via supercritical water is disclosed. The method comprises: conveying the selected polymeric material through an extruder, wherein the extruder is configured to continuously convey the selected polymeric material to a supercritical fluid reaction zone; injecting hot compressed water into the supercritical fluid reaction zone, while the extruder is conveying the selected polymeric material into the supercritical fluid reaction zone so as to yield a mixture; retaining the mixture within the reaction zone for a period of time sufficient to yield the plurality of reaction products. The reaction zone may be characterized by a tubular reactor having an adjustably positionable inner tubular spear, wherein the tubular reactor and the inner tubular spear further define an annular space within the reaction zone, and wherein the mixture flows through the annular space and into a reaction products chamber.

8 Claims, 2 Drawing Sheets

Related U.S. Application Data

12/402,489, filed on Mar. 11, 2009, now Pat. No. 7,955, 508.

(60) Provisional application No. 61/035,380, filed on Mar. 11, 2008, provisional application No. 61/110,505, filed on Oct. 31, 2008.

(51) Int. Cl.

| | | |
|---|---|---|
| *B01J 8/00* | (2006.01) | |
| *B01J 19/18* | (2006.01) | |
| *B01J 8/20* | (2006.01) | |
| *B01J 8/42* | (2006.01) | |
| *B01J 3/00* | (2006.01) | |
| *B01J 8/18* | (2006.01) | |
| *B01J 19/08* | (2006.01) | |

(52) U.S. Cl.
CPC ........ *B01J 8/42* (2013.01); *B01J 19/087* (2013.01); *B01J 2219/0854* (2013.01); *B01J 2219/089* (2013.01); *B01J 2219/182* (2013.01)
USPC .......... 264/37.18; 210/175; 210/749; 264/11; 422/208; 422/236; 422/242; 422/618

(56) References Cited

U.S. PATENT DOCUMENTS

| | | | | |
|---|---|---|---|---|
| 3,844,721 | A | * | 10/1974 | Cariou et al. ................ 422/198 |
| 4,237,226 | A | | 12/1980 | Grethlein |
| 4,265,732 | A | * | 5/1981 | Dinulescu .................... 208/106 |
| 4,271,007 | A | * | 6/1981 | Souhrada et al. ........... 208/48 R |
| 4,413,646 | A | | 11/1983 | Platt et al. |
| 4,642,287 | A | | 2/1987 | Inoi et al. |
| 4,744,926 | A | | 5/1988 | Rice |
| 4,747,948 | A | | 5/1988 | North |
| 4,843,131 | A | * | 6/1989 | Becker et al. .................. 526/65 |
| 4,849,554 | A | | 7/1989 | Cresswell et al. |
| 5,216,149 | A | | 6/1993 | Evans et al. |
| 5,278,282 | A | | 1/1994 | Nauman et al. |
| 5,324,904 | A | | 6/1994 | Cresswell et al. |
| 5,386,055 | A | * | 1/1995 | Lee et al. .................... 562/512.2 |
| 5,405,533 | A | | 4/1995 | Hazlebeck et al. |
| 5,411,594 | A | | 5/1995 | Breisford |
| 5,558,783 | A | | 9/1996 | McGuinness |
| 5,670,614 | A | | 9/1997 | Roby et al. |
| 5,707,673 | A | | 1/1998 | Prevost et al. |
| 5,882,605 | A | * | 3/1999 | Sortwell ........................ 422/135 |
| 6,060,584 | A | * | 5/2000 | Neely et al. ................... 528/501 |
| 6,083,409 | A | | 7/2000 | Lin et al. |
| 6,090,595 | A | | 7/2000 | Foody et al. |
| 6,107,532 | A | | 8/2000 | Saito et al. |
| 6,180,845 | B1 | | 1/2001 | Catallo et al. |
| 6,409,841 | B1 | | 6/2002 | Lombard |
| 6,504,068 | B1 | | 1/2003 | Matsubara et al. |
| 6,569,640 | B1 | | 5/2003 | Castor et al. |
| 6,602,064 | B1 | | 8/2003 | Chen et al. |
| 6,676,716 | B2 | * | 1/2004 | Fujimura et al. ......... 48/197 FM |
| 6,884,377 | B1 | | 4/2005 | Burnham et al. |
| 6,966,874 | B2 | | 11/2005 | Cornay et al. |
| 7,070,743 | B2 | | 7/2006 | Blackwell et al. |
| 7,189,306 | B2 | | 3/2007 | Gervais |
| 7,318,713 | B2 | | 1/2008 | Xu et al. |
| 7,399,408 | B2 | * | 7/2008 | Joussot-Dubien et al. ... 210/179 |
| 7,722,690 | B2 | | 5/2010 | Shires et al. |
| 7,955,508 | B2 | * | 6/2011 | Allan et al. ................... 210/749 |
| 7,972,573 | B2 | | 7/2011 | Scott et al. |
| 8,057,666 | B2 | * | 11/2011 | Allan et al. ................... 210/177 |
| 8,342,735 | B2 | * | 1/2013 | Black et al. ..................... 366/78 |
| 2002/0148575 | A1 | | 10/2002 | Wingerson |
| 2004/0094144 | A1 | * | 5/2004 | Ikegami et al. ................... 127/1 |
| 2005/0009935 | A1 | | 1/2005 | Mukaide et al. |
| 2005/0242464 | A1 | * | 11/2005 | Goto et al. ................ 264/211.24 |
| 2006/0141584 | A1 | | 6/2006 | Litzen et al. |
| 2006/0283995 | A1 | | 12/2006 | Wingerson |
| 2007/0110837 | A1 | * | 5/2007 | Goto et al. ..................... 425/203 |
| 2007/0161095 | A1 | * | 7/2007 | Gurin ............................. 435/134 |
| 2008/0020437 | A1 | | 1/2008 | Savarese |
| 2008/0081935 | A1 | * | 4/2008 | Datsevich et al. ............. 585/241 |
| 2008/0196299 | A1 | | 8/2008 | Anitescu et al. |
| 2008/0229653 | A1 | | 9/2008 | Iversen et al. |

OTHER PUBLICATIONS

Shiro Saka, Katsunobu Ehara, Seiya Sakaguchi, and Kei Yoshida, "Useful Products from Lignocellulosics by Supercritical Water Technologies", delivered at the 2nd Joint International Conference on "Substainable Energy and Environment (SEE 2006)" Nov. 1-23, 2006, Bangkok, Thailand, 5 pages.

Mitsumasa Osada, Takafumi Sato, Masaru Watanabe, Masayuki Shirai, and Kunioi Arai, "Catalytic Gasification of Wood Biomass in Subcritical and Supercritical Water", Combustion Science and Technology in vol. 178, Nos. 1-3, No. 1-3/Jan. 2006 pp. 537-552.

Yikihiko Matsumura, Mitsuru Sasaki, Kazuhide Okuda, Seiichi Takami, Satoshi Ohara, Mitsuoumetsu, and Tadafumi Adschiri, "Supercritical Water Treatment of Biomass for Energy and Material Recovery", Combustion Science and Technology in vol. 178, Nos. 1-3/Jan. 2006 pp. 509-536.

Z. Fang, T. Minowa, R.L. Smith, Jr., T. Ogi and J.A. Kozinski, "Liquefaction and Gasification of Cellulose with Na2CO3 and Ni in Subcritical Water at 350 °C", Ind. Eng. Chem. Res., 2004, 43(1), pp. 2454-2463, Publication Date (Web): Apr. 16, 2004 (Article).

Ali Sinag, Andrea Kruse, and Jens Rathert, "Influence of the Heating Rate and the Type of Catalyst on the Formation of Key Intermediates and on the Generation" of Gases During Hydrophyrolysis of Glucose in Supercritical Water in a Batch Reactor Ind. Eng. Chem. Res., 2004, 43(2), pp. 502-508, Publication Date (Web): Dec. 23, 2003 (Article).

A. Kruse, T. Henningsen, A. Sinag, and J. Pfeiffer, "Biomass Gasification in Supercritical Water: influence of the Dry Matter Content and the Formation of Phenois" Ind. Eng. Chem. Res., 2003, 42(16), pp. 3711-3717, Publication Date (Web): Jul. 11, 2003 (Article), DOI: 10.1021/ie0209430.

Takuya Yoshida, Yoshito Oshima, and Yukihiko Matsumura, "Gasification of biomass model compounds and real biomass in supercritical water" Biomass and Bioenergy, vol. 26, Issue 1, Jan. 2004, pp. 71-78.

A. Kruse and A. Gawlik, "Biomass Conversion in Water at 330-410 °C and 30-50 MPa. Identification of Key Compounds for Indicating Different Chemical Reaction Pathways", Ind. Eng. Chem. Res., 2003, 42(2), pp. 267-279, Publication Date (Web): Dec. 18, 2002 (Article).

B. Potic, L. L Van De Beld, D. Assink, W. Prins and W.P.M. Van Swaaij, "Gasification of Biomass in Superciritical Water" paper, University of Twente, Faculty of Chemical Technology circa 2006.

Katsunobu Ehara, Shiro Saka, and Haruo Kawamoto, "Characterization of the Lignin-derived Products from Wood as Treated in Supercritical Water" J. Wood Sci (2002) vol. 48, No. 1, pp. 320-325.

Mitsuru Sasaki, Momoko Furukawa, Kimitaka Minami, Tadafumi Adschiri, and Kunio Arai, "Kinetics and Mechanism of Cellobiose Hydrolysis and Retro-Aldol Condensation in Subcritical and Supercritical Water" Ind. Eng. Chem. Res., 2002, 41(26), pp. 6642-6649, Publication Date (Web): Nov. 19, 2002 (Article).

Takuya Yoshida and Yukihiko Matsumura, "Gasification of Cellulose, Xyland, and Lignin Mixtures in Supercritical Water" Ind. Eng. Chem. Res., 2001, 40(23), pp. 5469-5474, Publication Date (Web): Oct. 18, 2001 (Article) DOI: 10.1021/ie01590.

K. Ehara, S. Saka and H. Kawamoto, "Chemical Conversion of Woody Biomass by Supercritical Water-Degradation of Lignin" 12th European Conference on Biomass for energy, Industry and Climate Protection, Jun. 17-21, 2002, Amsterdam, The Netherlands, (2002) pp. 805-808.

Andrea Kruse, Danny Meier, Pia Rimbrecht, and Michael Schacht, "Gasification of Pyrocatechol in Supercritical Water in the Presence of Potassium Hydroxide" Ind. Eng. Chem. Res., 2000, 39 (12), pp. 4842-4848, Publication Date (Web): Nov. 16, 2000 (Article) DOI: 10.1021/ie0001570.

Michael Jerry Antal, Jr., Stephen Glen Allen, Deborah Schuman, and Xiaodong Su, Robert H, Divilio, "Biomass Gasification in Supercritical Water" Ind. Eng. Chem. Res., 2000, 39(11), pp. 4040-4053, Publication Date (Web): Oct. 14, 2000 (Article).

(56) References Cited

OTHER PUBLICATIONS

Hiroki Ando, Tsuyoshi Sakaka, Tesuro Kokusho, Masao Shibata, Yoshimitsu Uemura, and Yasuo Hatate, "Decomposition Behavior of Plant Biomass in Hot-Compressed Water", Ind. Eng. Chem. Res., 2000, 39(10), pp. 3688-3693, Publication Date(Web): Aug. 23, 2000 (Article).

Mitsuru Sasaki, Zhen Fang, Yoshiko Fukushima, Tadafumi Adschiri, and Kunio Arai, "Dissolution and Hydrolysis of Cellulose in Subcritical and Supercritical Water" Ind. Eng. Chem. Res., 2000, 39(8), pp. 2883-2890 Publication Date (Web): Aug. 7, 2000 (Article) DOI: 10.1021/ie990690j.

Philip E. Savage, "Organic Chemical Reactions in Supercritical Water", University of Michigan, Chemical Engineering Department, Ann Arbor, Michigan 48109-2136, Chem. Rev., 1999, 99(2), pp. 603-622, DOI: 10.1021/cr9700989, Publication Date (Web): Jan. 5, 1999.

Shiro Saka and Tomonori Ueno, "Chemical conversion of various celluloses to glucose and its derivatives in supercritical water" Cellulose, vol. 6, No. 3, Sep. 1999, pp. 177-191(15) Publisher: Springer.

B.M. Kabyemela, M. Takigawa, T. Adschiri, R.M. Malaluan, and K. Arai, "Mechanism and Kinetics of Cellobiose Decomposition in Sub-and Supercritical Water" Ind. Eng. Chem. Res., 1998, 37(2), pp. 357-361, Publication Date (Web): Jan. 9, 1998 (Article), DOI: 10.1021/ie9704408.

Misuru Sasaki, Bernard Kabyemela, Roberto Malaluan, Satoshi Hirose, Naoko Takeda, Tadafumi Adschiri, and Kuinio Arai, "Cellulose Hydrolysis in subcritical and supercritical water" The Journal of Supercritical Fluids vol. 13 Issues 1-3, pp. 261-268 (1998).

Bernard M. Kabyemela, Tadafumi Adschiri, Roberto Malaluan, and Kunio Arai Degradation Kinetics of Dihydroxyacetone and Glyceraldehyde in Subcritical and Supercritical Water: Ind. Eng. Chem. Res., 1997, 36(6), pp. 2025-2030 Publication Date (Web): Jun. 2, 1997 (Article) DOI: 10.1021/ie960747r.

Bernard M. Kabyemela, Tadafumi Adschiri, Roberto M. Malaluan, Kunio Arai, and Hiroshi Ohzeki, "Rapid and Selective Conversion of Glucose to Erythrose in Supercritical Water", Ind. Eng. Chem. Res., 1997, 36(12), pp. 5063-5067 Publication Date (Web): Dec. 1, 1997 (Article).

Bernard M. Kabyemela, Tadafumi Adschiri, Roberto M. Malaluan, Kunio Arai, "Kinetcis of Glucose Epimerization and Decomposition in Subcritical and Supercritical Water" Ind. Eng. Chem. Res., 1997 36(5), pp. 1552-1558 Publication Date (Web): May 5, 1997 (Article) DOI: 10.1021/ie960250h.

Xiaodong Xu, Yukihiko Matsumura, Jonny Stenberg, and Michael Jerry Antal, Jr., "Carbon-Catalyzed Gasification of Organic Feedstocks in Supercritical Water" Ind. Eng. Chem. Res., 1996, 35(8), pp. 2522-2530 Publication Date (Web): Aug. 8, 1996 (Article) DOI: 10.1021/ie950672b.

Phillip E. Savage, Sudhama Goplalan, Tahmid I. Mizan, Christopher J. Martino, and Eric E. Brock, "Reactions at Supercritical Conditions: Applications and Fundamentals" AIChE Journal Jul. 1995 vol. 41, No. 7 p. 1723-1778.

Douglas C. Elliot, M.R. Phelps, L. John Sealock Jr., and Eddie G. Baker, "Chemical Processing in High-Pressure Aqueous Environments. 4. Continuous-Flow Reactor Process Development Experiments for Organics Destruction" Ind. Eng. Chem. Res., 1994, 33(3), pp. 566-574 Publication Date: Mar. 1994.

Douglas C. Elliot, L. John Sealock Jr., and Eddid G. Baker, "Chemical processing in high-pressure aqueous environments. 2. Development of catalysts for gasification" Ind. Eng. Chem. Res., 1993 32(8), pp. 1542-1548 Publication Date: Aug. 1993 (Article) DOI: 10.1021/ie00020a002.

K. Ehara and S. Saka, Chemical Conversion of Cellulose by Batch-Type and Flow-Type Supercritical Water Systems: 12th European Conference on Biomass for energy, Industry and Climate Protection, Jun. 17-21, 2002, Amsterdam, The Netherlands, (2002) pp. 801-804.

Mitch Jacoby, "Chemicals from the Garden", Chemical & Engineering News, Jul. 6, 2009 vol. 87, No. 27, p. 10 p. 26-28.

Tao Xiang and Kieth P. Johnston, "Acid-Base of Behavior of Organic Compounds in Supercritical Water" The Journal of Physical Chemistry, Publication Date (Web) May 1, 2002.

Gerald E. Bennett and Keith P. Johnston, "UV-visible absorbance spectroscopy of organic probes in supercritical water", The Journal of Physical Chemistry, Publication Date (Web) May 1, 2002.

Christine J. Wu, Laurence E. Fried, Lin H. Yang, Nir Goldman and Sorin Bastea "Catalytic behavior or dense hot water", Nature Chemistry vol. 1, Apr. 2009 published online: Mar. 19, 2009.

M. Goto, M. Sasaki, T. Hirose, "Reactions of polymers in supercritical fluids for chemical recycling of waste plastics", Journals of Materials Science vol. 41 No. 5, Mar. 2006, p. 1509-1515.

* cited by examiner

BIOMASS AND WASTE PLASTICS DEPOLYMERIZATION MACHINE AND METHODS VIA SUPERCRITICAL WATER

CROSS-REFERENCE TO RELATED APPLICATIONS

This application is a continuation-in-part of U.S. application Ser. No. 12/828,102 filed on Jun. 30, 2010 now U.S. Pat. No. 8,057,666, and U.S. application Ser. No. 12/402,489 filed on Mar. 11, 2009, now U.S. Pat. No. 7,955,508, which application claims the benefit of U.S. Provisional Application No. 61/035,380 filed on Mar. 11, 2008, and U.S. Provisional Application No. 61/110,505 filed on Oct. 31, 2008, which applications are all incorporated herein by reference in their entireties for all purposes.

TECHNICAL FIELD

The present invention relates generally to biomass and waste plastic conversion systems and, more specifically, to machines and methods of depolymerising naturally occurring and synthetic polymers (namely, biomass and waste plastics) into smaller molecules by reaction with a hot compressed and/or supercritical water.

BACKGROUND OF THE INVENTION

Everyday the Sun pours down onto the Earth a vast quantity of radiant energy many many times greater than the total now used by Man. Some of this energy, together with carbon dioxide and water, Nature traps in trees and other plants by conversion into giant chemical molecules, collectively called biomass. The major components (about 60% to 80%) of this mixture are polysaccharides. Polysaccharides are long and substantially linear chains, the individual links of which are simple sugars. The remaining component (about 15% to 25%) is called lignin and is a complex network of joined aromatic rings of the type present in liquid diesel engine fuel. The energy trapped within plants can be recovered, in part, by breaking down the long chains into their constituent sugar links for subsequent standard fermentation into bioethanol. In contrast, the breakdown of the lignin network can yield simple aromatic compounds for possible direct incorporation into diesel fuel. The problem facing chemical engineers has been how to achieve these demonstrated chemical breakdowns on a large-scale, commercially practical, and energy efficient way.

There exists immense amounts of biomass materials in forests and crops, and cellulose, the main component, is one of the most abundant natural resources available on the Earth. In this regard, natural cellulosic feedstocks are now commonly referred to as "biomass," and biomass materials are known to generally consist primarily of cellulose (~40% to ~50%), hemicellulose (~20% to ~30%), and lignin (~15% to ~25%) bound together in a complex structure together with smaller amounts of pectins, proteins, and ash. Many types of biomass, including, for example, wood, paper, agricultural residues such as bagasse, switchgrass, wheat or sorghum straw, corn husks, and the like have long been considered as possible feedstocks for the manufacture of certain organic chemicals, but thus far existing biomass conversion technologies have achieved only limited success. It is believed by many that due to the complex chemical structure of most biomass materials, microorganisms and enzymes cannot effectively attack the cellulose component without prior treatment. Indeed, conventional methods for converting cellulose to glucose by way of acid hydrolysis and enzymatic saccharification are known to be inefficient and, consequently, are not yet commercially viable.

More recently, however, the chemical conversion of cellulose with supercritical water to obtain various sugars has been studied. (see, e.g., M. Sasaki, B. Kabyemela, R. Malaluan, S. Hirose, N. Takeda, T. Adschiri & K. Arai, Cellulose hydrolysis in subcritical and supercritical water, *J. Supercritical Fluids,* 13, 261-268 (1998); S. Saki & T. Ueno, Chemical conversion of various celluloses to glucose and its derivatives in supercritical water, *Cellulose,* 6, 177-191 (1999).) These more recent studies are among the first to demonstrate that cellulose may be rapidly hydrolyzed in supercritical water to yield glucose (in high yield) in either flow or batch type micro-reactors. The use of flow or batch type micro-reactors, however, is not a realistic option for the commercial-scale production of cellulosic based motor fuels.

Nowadays, everyone is aware of the desirability of having new domestic sources of liquid fuels for diesel as well as gasoline engines. Likewise, it is generally recognized that the USA has been living in the Age of Plastics for the past 75 years. This has become a throwaway age and multi-ton quantities of plastics are discarded daily all around the world.

In the major cities of the USA, it is now standard to have special bins everywhere in which recyclable material can be dumped. Originally, this recyclable designation was restricted to paper and cardboard but now plastics in general are accepted. Strangely enough, in Seattle polystyrene foam and packaging material is excluded, and must be dumped in the regular garbage cans. The contents of the recycle bins are collected in a special truck and are transported to a municipal recycling center. There the various components are separated.

Now the discarded plastics, separated at the recycle center, consist of long chains of thousands of atoms called polymers. Of the commercially most important polymers, polystyrene (PS), polyethylene (PE) and polypropylene (PP), have chains that contain only carbon and hydrogen atoms in amounts similar to the hydrocarbons in diesel and gasoline fuels. Thus, the molecules in diesel and gasoline are chemically similar to the polymers but are much smaller in size. It has therefore been appreciated for some time that if the long chains of the plastics could be broken down into smaller pieces these moieties could find use as chemical feedstocks.

One of the most intriguing and environmentally sound approaches to breaking down plastics is simply to use water alone, heated to its supercritical state. About a decade ago this chemical-free technology was comprehensively discussed in an English language review by P. E. Savage (Chem. Rev. 1999, 99, 609). Since then few modern reviews have appeared. However, numerous articles, mostly from Japan and China, have appeared each year dealing with the treatment of plastics with supercritical water. All of these publications emphasize that when water is heated to 374.4 C or above, the pressure concomitantly generated is 217.7 atm and the water then becomes a powerful new reactive solvent. Temperatures above 400 C seem to make the water even more effective in its new role. For example, it now dissolves PS and breaks it down in 100% yield into a mixture of styrene, methylstyrene, styrene dimers and trimers, toluene, ethylbenzene, isopropylbenzene, 1,3-diphenylpropane and 1,3-diphenylbutane. (H. Kwak, H.-Y. Shin, S.-Y. Bae and H. Kumazawa, J. Appl. Poly. Sci. 2006, 101, 675). All of these substances are immiscible with water at room temperature and could be components of a diesel fuel.

These and numerous other similar reactions (J. A. Onwudili & P. T. Williams, Chemosphere 2009, 74(6), 787) demonstrate clearly that plastics can be broken down by treatment with supercritical water. Apparently the water and plastic undergoes the water gas reaction and hydrogen is released to combine with the chain fragments from the plastics. This has actually been demonstrated by the use of deuterium oxide in place of water and the consequent finding of deuterium in the fragments. However, since nearly all water-plastic reactions have been run in a batch mode on a very small scale, the chemistry so elegantly elucidated does not provide answers to the questions necessary for the future development of a commercially-sized, practical, continuous, supercritical water-based process.

As is commonly understand by those with backgrounds in chemical engineering, petroleum-based diesel fuels are produced from the fractional distillation of crude oil between 200 C (392° F.) and 350° C. (662° F.) at atmospheric pressure, resulting in a mixture of carbon chains that typically contain between 8 and 21 carbon atoms per molecule. Diesel fuels are approximately similar to fuel oils used for heating (fuel oils no. 1, no. 2, and no. 4). All fuel oils consist of complex mixtures of aliphatic and aromatic hydrocarbons. The aliphatic alkanes (paraffins) and cycloalkanes (naphthenes) are hydrogen saturated and compose approximately 80-90% of the fuel oils. Aromatics (e.g., benzene) and olefins (e.g., styrene and indene) compose 10-20% and 1%, respectively, of the fuel oils. Fuel oil no. 1 (straight-run kerosene) is a light distillate which consists primarily of hydrocarbons in the C9-C16 range; fuel oil no. 2 is a heavier, usually blended, distillate with hydrocarbons in the C11-C20 range. Straight-run distillates may also be used to produce fuel oil no. 1 and diesel fuel oil no. 1. Diesel fuel no. 1 and no. 2 are similar in chemical composition to fuel oil no. 1 and fuel oil no. 2, respectively, with the exception of the additives. Diesel fuels predominantly contain a mixture of C10 through C19 hydrocarbons, which include approximately 64% aliphatic hydrocarbons, 1-2% olefinic hydrocarbons, and 35% aromatic hydrocarbons.

Accordingly, and although some progress has made with respect to the development of biomass and/or waste plastic conversion systems, there is still a need in the art for new and improved machines, systems, and methods for converting biomass and/or waste plastics into simple sugars, hydrocarbons, and/or aromatic chemicals as the case may be which, in turn, can be readily converted into liquid transportation fuels. The present invention fulfills these needs and provides for further related advantages.

SUMMARY OF THE INVENTION

The present invention in one embodiment is directed to a method for transforming a selected polymeric material into a plurality of reaction products. The innovative method of the present invention comprises at least the following steps: conveying the selected polymeric material (e.g., biomass, a waste plastic, or a combination thereof) through an extruder (single or twin screw) so as to define a selected polymeric material flowstream, wherein the extruder is configured to continuously convey the selected polymeric material from an upstream inlet to a supercritical fluid reaction zone; injecting hot compressed water into the supercritical fluid reaction zone while the extruder is conveying the selected polymeric material flowstream into the supercritical fluid reaction zone so as to yield a mixture; retaining the mixture within the reaction zone for a period of time (e.g., from about 0.4 to about 10 seconds) sufficient to yield the plurality of reaction products, wherein the reaction zone is defined by a tubular reactor shell having an inner tubular spear, wherein the tubular reactor and the inner tubular spear further define an annular space within the reaction zone, and wherein the mixture flows through the annular space (and wherein the inner tubular spear is adjustably movable in back and forth directions within the tubular reactor so as to selectable increase or decrease the volume of the reaction zone); and expelling the plurality of reaction products out of the supercritical fluid reaction zone and into a reaction products chamber. The method may further comprise a step of separating the plurality of reaction products into an aqueous phase and a non-aqueous phase.

In another embodiment, the present invention is directed to an innovative tube and spear reactor as herein shown and described, as well as to related extruder-based machinery and fluid expansion chambers.

These and other aspects of the present invention will become more evident upon reference to the following detailed description and accompanying drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain exemplary embodiments of the present invention and as such they are not necessarily drawn to scale. In addition, it is to be expressly understood that the relative dimensions and distances depicted in the drawings are exemplary and may be varied in numerous ways. Finally, like reference numerals have been used to designate like features throughout the views of the drawings.

DETAILED DESCRIPTION OF INVENTION

Figure 1:
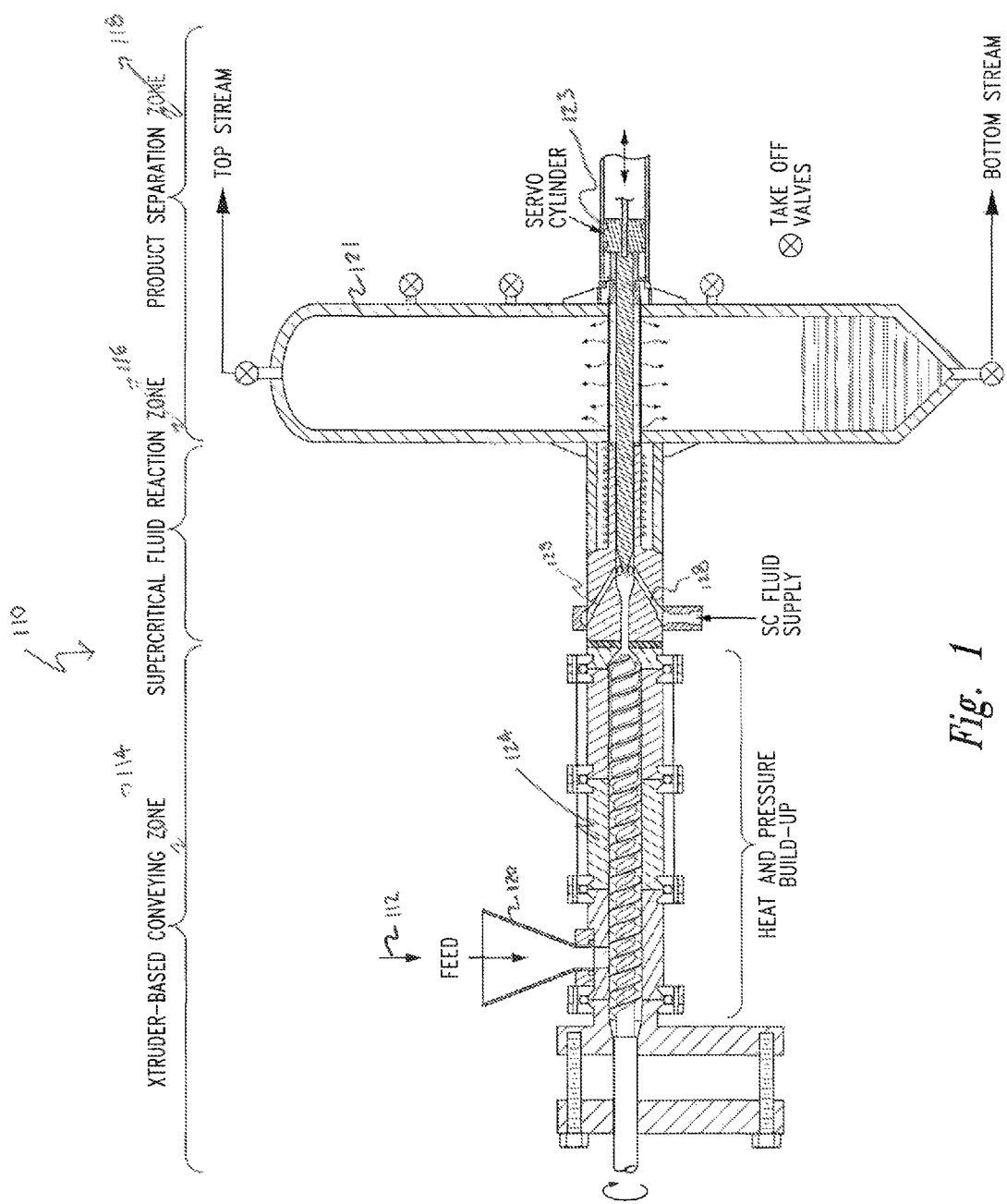
FIG. 1 shows a side elevational cross-sectional view of an extruder-fed induction-heated supercritical fluid polymer depolymerization machine in accordance with an embodiment of the present invention.
Figure 2:
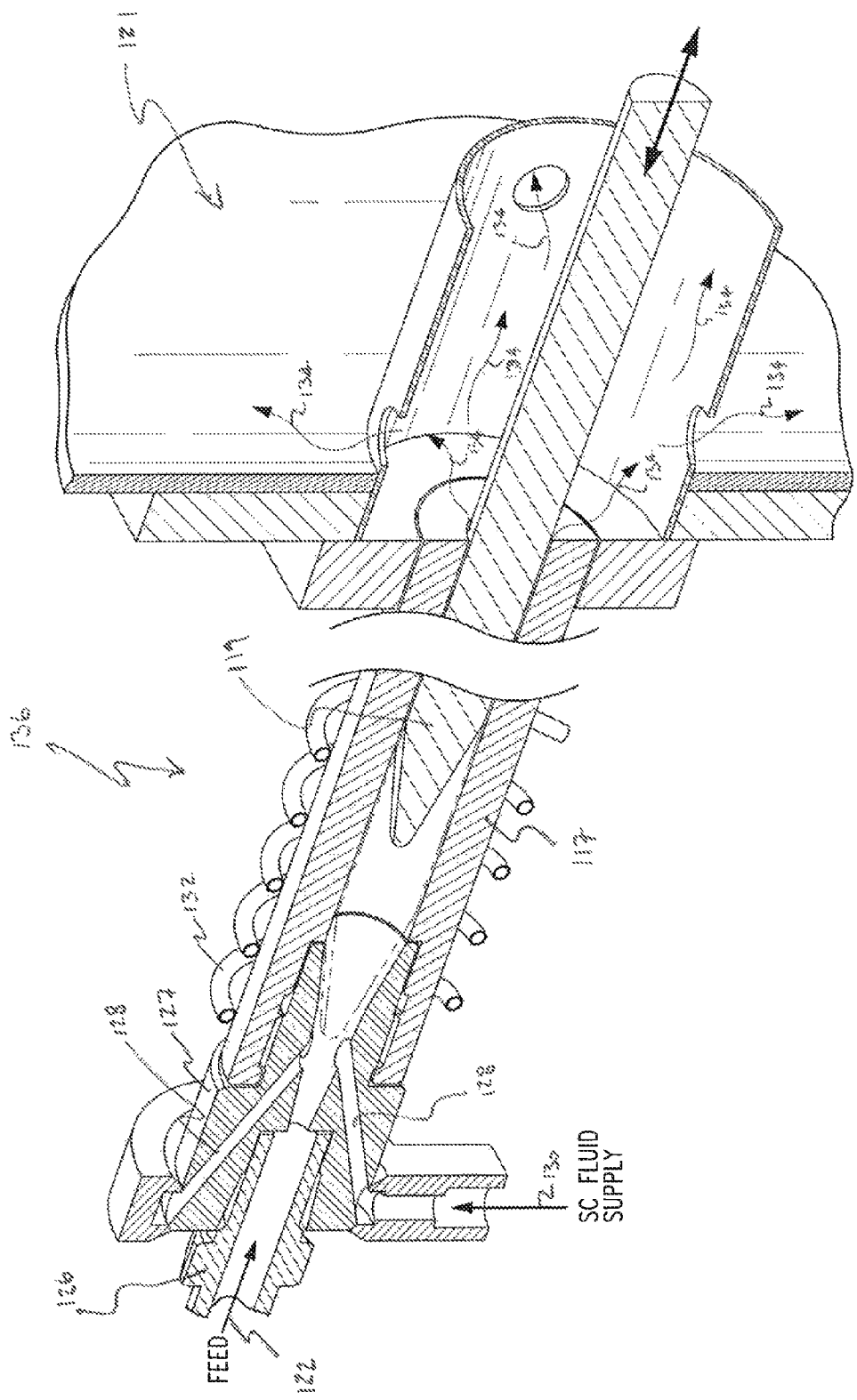
FIG. 2 shows a partial cross-sectional view of a supercritical fluid reaction zone defined by a spear-and-tube reactor in accordance with an embodiment of the present invention.

Referring now to the drawings where like numerals have been used to designate like features throughout the views, and more specifically to FIGS. 1 and 2, the present invention in one embodiment is directed to a supercritical fluid polymer depolymerization conversion machine/system 110 capable of converting a selected biomass and/or waste plastic material 112 into a plurality of reaction products (not shown). In the context of the present invention, the term "biomass" means any plant derived organic matter, including dedicated energy crops and trees, agricultural food and feed crops, agricultural crop wastes and residues, wood wastes and residues, aquatic plants, algae, animal wastes, municipal wastes, and other like organic materials—whereas the term "waste plastic" means a synthetic polymer. As shown, the polymer conversion machine/system 110 of the present invention comprises, in fluidic series, three discreet zones: namely, (1) an extruder-based conveying zone 114; (2) a supercritical fluid reaction zone 116; and (3) a reaction products separation zone 118.

In accordance with the novel approach of the present invention, a specialized extruder conveys the selected biomass and/or waste plastic materials 112 from an upstream hopper 120 to the downstream supercritical fluid reaction zone 116, while increasing the pressure from about atmospheric to greater than about 3,200 psi. The extruder-based approach is important because it enables the conveyance of near-solid materials (as opposed to conventional slurry pumping technologies used in the prior art). The heated and pressurized near-solid materials (biomass and/or waste plastic) 122 exits the extruder 124 through a specialized die 126 connected to a manifold 127 that includes a plurality of circumferentially positioned supercritical fluid injection channels 128 configured to inject hot compressed water 130 (or other fluid) into the supercritical fluid reaction zone 116.

In a preferred embodiment, hot compressed water 130 is injected into the supercritical fluid reaction zone 116 by way of the injection channels 128 while the extruder 124 is conveying the selected polymeric materials 112 into the supercritical fluid reaction zone 116 so as to yield a mixture (not shown). The supercritical fluid reaction zone 116 further heats the flowing and pressurized polymeric materials 122 and hot compressed water 130 mixture to conditions at or above supercritical by means of a circumferentially positioned, high efficiency alternating current induction coil 132 (which, in turn, is connected to an induction heater (not shown)) to thereby yield the plurality of reaction products 134. The resulting liquefied and/or gaseous reaction products 134 are then conveyed through a highly innovative spear-and-tube reactor 136.

As best shown in FIG. 2, the spear-and-tube reactor 136 of the present invention allows a controlled and/or minimal amount of supercritical water to enter into the system (i.e., preferably less than about 100% to about 20% by weight basis). More specifically, the reaction zone 116 is defined by a tubular reactor shell 117 having an inner tubular spear 119, wherein the tubular reactor shell 117 and the inner tubular spear 119 further define an annular space within the reaction zone. As shown, the polymeric materials 122 and hot compressed water 130 mixture yield the plurality of reactions products 134 that flow through the annular space and are expelled into an innovative expansion/separation chamber 121. The expansion/separation chamber 121 preferably contains liquid water and a hydrocarbon solvent to facilitate liquid-liquid extraction and phase separation of the resulting neodiesel and water. As further shown, the inner tubular spear 119 is adjustably movable in back and forth directions within the tubular reactor shell 117 by means of a servo cylinder 123 so as to selectable increase or decrease the volume of the reaction zone.

Without necessarily prescribing to any particular scientific theory, it is believed that at supercritical conditions the water component is at a supercritical state, thereby enabling (in the context of a selected biomass material) the rapid hydrolysis and depolymerization of the surrounding biomass's main polysaccharide components (cellulose and hemicellulose) into one or more fermentable sugars, and the main polyphenolic components into one or more simple aromatic compounds. In the context of one or more waste plastics, supercritical water (SCW) breaks down, for example, polyethylene (PE) by cleaving the carbons at various locations along the backbone and simultaneously capturing hydrogen atoms from the water. As a consequence a whole range of linear hydrocarbons of various lengths are formed. Most of these have been found to be soluble in regular gasoline and may be most readily utilized in the automobile fuel market. In the case of polypropylene (PP) the breakdown fragments will not be linear, but branched, because of the side chain methyl groups on every other carbon atom in the polymer backbone. These branched structures have been found to be even more soluble in gasoline than their counterparts from polyethylene. Again, the specific fuel market will likely be for trucks and automobiles at some percentage addition value. When the starting renewable plastic is polystyrene (PS), the breakdown fragments are somewhat different because supercritical water does not readily cleave aromatic rings. The aliphatic backbone chain of polystyrene is of course cut by the supercritical water as with polyethylene and polypropylene backbones, but the polystyrene-derived fragments contain aromatic rings that originate from the phenyl rings. Thus, the supercritical water product has been found to be more like the aromatic components of kerosene with its alkylbenzenes currently usable in diesel. These aromatic higher boiling substances have been found to be more compatible with diesel fuel usage rather than gasoline.

The present invention is also directed to a method for converting a selected biomass and/or waste plastic material into a plurality of reaction products. Accordingly, and in another embodiment, a method of the present invention comprises the steps of: providing an elongated conveying zone that contains two or more elongated rotatable shafts having a plurality of flighted screws positioned lengthwise within an elongated conveying section housing, wherein the plurality of flighted screws are positioned about each respective two or more elongated rotatable shafts, and wherein the two or more elongated rotatable shafts are configured to continuously convey the selected biomass and/or waste plastic material (optionally together with water or other liquid) from an upstream inlet to a supercritical fluid reaction zone while increasing the pressure of the selected biomass and/or waste plastic material from about atmospheric at the inlet to greater than about 22.1 MPa at the supercritical fluid reaction zone; conveying a mixture of the selected biomass and/or waste plastic material through the elongated conveying zone and into the supercritical fluid reaction zone; heating and further pressurizing the mixture within the supercritical fluid reaction zone, while injecting hot compressed and/or supercritical water into the supercritical fluid reaction zone, to yield a plurality of reaction products, wherein heat energy is supplied by means of an induction heating coil positioned circumferentially about the supercritical fluid reaction zone; retaining the mixture within the supercritical fluid reaction zone for a period of time sufficient to yield the plurality of reaction products; expelling the plurality of reaction products out of the supercritical fluid reaction zone and into a separation zone; and separating the plurality of reaction products into at least a water soluble fraction and an organic solvent soluble fraction.

In this method, the period of time that the mixture is retained within the supercritical fluid reaction zone generally ranges from about 0.4 to about 10 seconds (but may include much greater periods of time up to an hour and above). This method may also comprises the further steps of adding a phenolic compound to the plurality of reaction products to thereby retard the formation of certain degradation reaction products, as well as a step of adding a plurality of electrically conductive particles to the mixture of the selected biomass and/or waste material and water such the plurality of electrically conductive particles are heated while passing through the induction coil.

Finally, and for purposes of efficient heat transfer across the flowing biomass and/or waste plastic material fluid stream, it is contemplated that a suitable heat transfer agent such as, for example, a heavy petroleum oil or oil shale, or a recyclable low melting metal (tin, mp 232° C. or lead, mp 327° C.) or metal alloy, preferably Wood's metal (an alloy of Bismuth 50%, Cadmium 12.5%, Lead 25% and Tin 12.5%, mp 73-77° C.) may be added to biomass and/or waste plastic material feedstock prior to its introduction into the co-rotating twin screw extruder.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method for transforming a selected polymeric material into a plurality of reaction products, the method comprising the steps of:
   conveying the selected polymeric material through an extruder so as to define a selected polymeric material flowstream, wherein the extruder is configured to continuously convey the selected polymeric material from an upstream inlet to a supercritical fluid reaction zone;
   injecting hot compressed water into the supercritical fluid reaction zone while the extruder is conveying the selected polymeric material flowstream into the supercritical fluid reaction zone so as to yield a mixture;
   retaining the mixture within the reaction zone for a period of time sufficient to yield the plurality of reaction products, wherein the reaction zone is defined by a tubular reactor having an inner tubular spear, wherein the tubular reactor and the inner tubular spear further define an annular space within the reaction zone, and wherein the mixture flows through the annular space; and
   expelling the plurality of reaction products out of the supercritical fluid reaction zone and into a reaction products chamber.

2. The method of claim 1 wherein the selected polymeric material is biomass, a waste plastic, or a combination thereof.

3. The method of claim 2 wherein the extruder is a twin screw extruder.

4. The method of claim 2 wherein the hot compressed water is supercritical water.

5. The method of claim 4 wherein the hot compressed water is in amount that is less than the amount of the selected polymeric material on a weight percent basis.

6. The method of claim 2 wherein the period of time ranges from about 0.4 to about 10 seconds.

7. The method of claim 2 wherein the inner tubular spear is adjustably movable in back and forth directions within the tubular reactor so as to selectable increase or decrease the volume of the reaction zone.

8. The method of claim 7, further comprising the step of separating the plurality of reaction products into an aqueous phase and a non-aqueous phase.

* * * * *